United States Patent [19]

Predescu et al.

[11] Patent Number: 4,747,773

[45] Date of Patent: May 31, 1988

[54] SHAFT KILN UTILIZED FOR LIME PRODUCTION

[76] Inventors: Lucian A. Predescu; Lucian D. Predescu, both of 3931 Somerset Pl., Tuscaloosa, Ala. 35405

[21] Appl. No.: 59,332

[22] Filed: Jun. 8, 1987

Related U.S. Application Data

[63] Continuation of Ser. No. 842,234, Mar. 21, 1986.

[51] Int. Cl.$^4$ .......................... F27B 15/00; F27D 1/08
[52] U.S. Cl. ......................................... 432/14; 432/95; 432/96; 432/99; 432/101
[58] Field of Search .................................... 432/95–101

[56] References Cited

U.S. PATENT DOCUMENTS

| | | | |
|---|---|---|---|
| 2,788,961 | 4/1957 | Pooley et al. | 432/101 |
| 3,142,480 | 7/1964 | Azbe | 432/99 |
| 3,285,590 | 11/1966 | Parsons | 432/99 |
| 3,544,090 | 12/1970 | Peeters | 432/95 |
| 3,887,326 | 6/1975 | Townley | 432/99 |
| 4,351,119 | 9/1982 | Meunier | 432/96 |

Primary Examiner—Henry C. Yuen
Attorney, Agent, or Firm—Jennings, Carter, Thompson & Veal

[57] ABSTRACT

A vertical shaft kiln utilized in calcining limestone defines a series of processing zones including an upper preheating zone, a first calcining zone, a second calcining zone having a length twice that of the first calcining zone and a material cooling zone, Burners inject burnt gases intermediate the two calcining zones. Major heat transfer to the limestone is accomplished in the first calcining zone by directing a major portion of the burnt gases in counter-current to the material flow therethrough. Minor heat transfer is accomplished in the second calcining zone by directing a minor portion of the burnt gases therethrough in co-current relation with the material. Combustion air is provided through ducts in the material cooling zones and mixed with the minor portion of burnt gases externally of the shaft prior to injection into the burners.

2 Claims, 2 Drawing Sheets

SHAFT KILN UTILIZED FOR LIME PRODUCTION

This is a continuation in part of Ser. No. 842,234 filed Mar. 21, 1986.

FIELD OF INVENTION

The present invention relates generally to kilns and in particular to kilns used in the processing of limestone. More particularly the invention may be characterized as a vertical shaft kiln and process wherein limestone is subjected to an optimal heat regime during the processing thereof. In even greater particularity the present invention may be described as a method and apparatus for processing limestone wherein the heat transfer between the kiln and the limestone is controlled in distinct zones.

BACKGROUND OF THE INVENTION

The utilization of shaft kilns and rotary kilns for the production of limestone is well known. The rotary kiln produces a higher quality limestone but has a high specific consumption of fuel and/or electricity and a high initial investment. Shaft kilns which are known to us produce lime of a low quality yet have a high consumption of fuel and/or electricity. Furthermore, such kilns have a low rate of production and can only use large grain limestone. Introduction of small grain limestone, that is limestone having an average diameter below a particular size, into conventional shaft kilns results in the small grain limestone being burned and the quality of the product suffers further degradation.

SUMMARY OF THE INVENTION

It is the object of the present invention to provide a shaft kiln which produces a high quality lime product and which can process small grain limestone through the use of an optimal temperature regime.

It is another object of the invention to provide an economical kiln for the production of limestone of a very simple construction.

Yet another object is to provide a shaft kiln with a high production rate and a low consumption of fuel and/or electricity.

A still further object of the invention is to provide a kiln wherein conventional fans that can be used to circulate and remove the hot gases.

These and other objects of our invention are accomplished through my novel structure and processes for utilizing this structure. Our structure is an upstanding hollow shaft kiln which is divided into a plurality of zones including an upper preheating zone, a first calcining zone, a second calcining zone, and a materials cooling zone. Limestone is introduced to the kiln via an air tight charging means at the top of the preheating zone. A plurality of adjustable ducts are provided at the material cooling zone to introduce fresh air to the kiln. The fresh air is drawn upwards in counter current with the material through the material cooling zone to a collector channel which is in communication with a fan which withdraws the fresh air from the shaft of the kiln and passes it to a set of burners located intermediate the first and second calcining zone. The burners inject hot gases resulting from the combustion of a fuel into the kiln. A minor portion of these hot gases are drawn downwardly through the second calcining zone to the collector channel where they are withdrawn from the shaft and mixed with the fresh air withdrawn from the cooling zone for recirculation to the burners. The remaining major portion of the hot gases are withdrawn upwardly through the first calcining zone to a collector which removes them from the kiln. The upper calcining zone is about one-half the length of the lower calcining zone; therefore, the limestone is subjected to the major flow of hot gases and consequently the major portion of the heat for only one third of the time it is in transit. The remainder of the transit time is in the second calcining zone where less heat is available for transfer to the limestone; thus, the product is not burned.

BRIEF DESCRIPTION OF THE DRAWINGS

Apparatus embodying features of my invention and which may be utilized in my process are depicted in the accompanying Figures which form a portion of this application and wherein.

DESCRIPTION OF A PREFERRED EMBODIMENT

Figure 1:
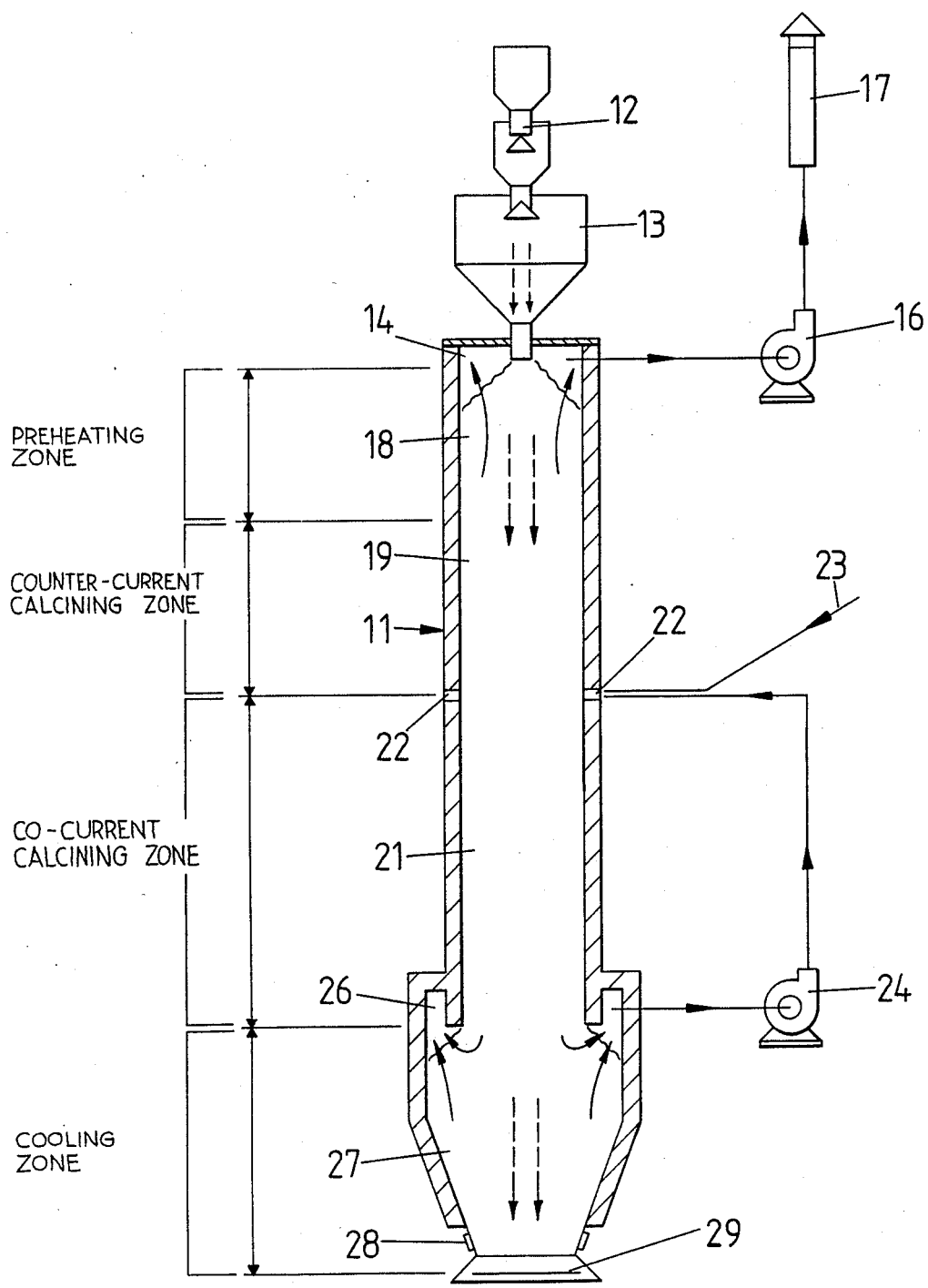
FIG. 1 is a schematic representation of my kiln.

As may be seen in FIG. 1 my apparatus is essentially a vertical hollow shaft kiln shown generally as 11. Atop the kiln 11 is an air tight charging device 12, and bunker-buffer 13 for limestone received from the charging device 12. Immediately below the bunker-buffer 13 is an exhaust collector channel 14 for evacuating burn gases from the kiln 11. This collector channel 14 is in communication with a fan 16 which is controlled to withdraw gases from the kiln 11 at a selected rate and exhausts the same through stack 17. Immediately beneath the bunker-buffer 13 is a preheating zone 18 through which limestone from the bunker-buffer 13 descends. Subjacent the preheating zone 18 is a first calcining zone 19 which has a predetermined length, L. A second calcining zone 21 having a length of approximately 2L is located beneath the first calcining zone 19. A plurality of burners 22 are located intermediate the first and second calcining zones and inject burnt gases into the kiln 11. The gases are the result of combustion of a fuel supplied through conduits 23 in the presence of a mixture of gases supplied to the burners 22 from a recirculation fan 24. The recirculation fan 24 draws these gases from a collector channel 26 located below the second calcining zone and above a material cooling zone 27. The material cooling zone has a plurality of adjustable apertures or ducts 28 about the bottom thereof through which fresh air or combustion gas may be admitted to the kiln 11. A discharging device 29 below the cooling zone permits removal of the product from the kiln. It should be noted that air is admitted to the kiln 11 only through the ducts 28.

To appreciate the utility of our invention it should be remembered that the calcining process is an endothermic reaction wherein heat is absorbed by the limestone and as long as $CO_2$ is evolved, the lime cannot be burnt. This process starts at the surface of the limestone and proceeds to the core and under optimal conditions proceeds at a rate which allows complete calcining of the limestone without overburning. It should also be remembered that the primary heat transport mechanism used is the hot burnt gases injected by the burners 22. Note that to calcine the limestone at a constant rate toward the center of each grain a greater quantity of heat must be transferred to the limestone per unit of radial measure at the beginning of the process than at the end. Stated differently, a larger volume of limestone is calcined in the outer region having a unit thickness than is calcined in each region of the same thickness inwardly thereof. Consequently, less heat should be transferred to the limestone in the later stages of calcining. By way of example, Chart I below presents an idealized volume of limestone composed of granules of limestone having diameters in the percentage shown in the chart, wherein the percentages indicated represent the percent of the total volume of the mass to be calcined at any one time. That is to say, 10% of the volume is made of granules having a diameter of 50 mm and so on.

CHART I

| QUANTITY | 10% | 20% | 20% | 20% | 20% | 10% |
|---|---|---|---|---|---|---|
| Sphere diameter | 50 mm | 60 mm | 70 mm | 80 mm | 90 mm | 100 mm |

Under optimal conditions, the total volume of the limestone will be calcined in 10 hours in accordance with the percentages shown in Chart II with nearly 80% of the volume being calcined in the first three hours. Thus the largest heat requirement occurs in the initial calcining of the material.

CHART II

| After 1 hour about | 36.0% | 6 hours about | 98.2% |
|---|---|---|---|
| After 2 hours about | 61.7% | 7 hours about | 99.4% |
| After 3 hours about | 78.9% | 8 hours about | 99.7% |
| After 4 hours about | 89.5% | 9 hours about | 99.8% |
| After 5 hours about | 95.4% | 10 hours about | 100.0% |

Figure 2:
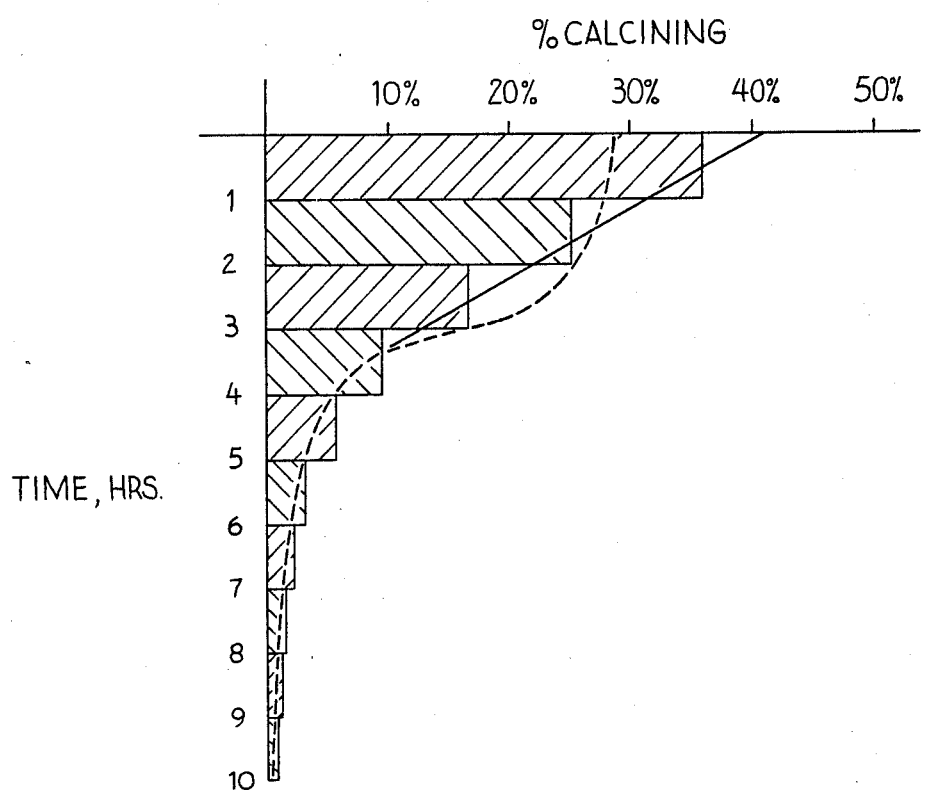
FIG. 2 is a graph of the optimal heating curve.

The optional heat transfer curve for a kiln is shown in FIG. 2 by the solid line A. The heat transfer characteristic of our kiln is shown by the dashed line B.

Our kiln makes possible the optimization of the calcining process by controlling the heat transfer in each calcining zone. The exhaust fan 16 and recirculation fan 24 of our kiln create a pressure regime in the kiln 11 such that 75 to 80% of the hot burnt gases injected by burners 22 pass upwards through the first calcining zone 19 and preheating zone 18 to the exhaust collector 14. Thus, the majority of the heat available for transfer to the limestone moves upward from the burner with the majority of the gases in counter-current flow to the material descending through the kiln 11. The first calcining zone 19 is where the majority of heat transfer takes place and as may be seen from the FIG. 1 is approximately one-third of the entire calcining zone. In as much as the material moves through the kiln at a constant rate it may be seen that the material is subjected to the major heat transfer during only about one-third of the time it is being calcined.

The recirculation fan 24 induces a co-current flow of a minor portion of the burnt gases, 20 to 25%, through the second calcining zone 21, thereby providing heat in sufficient quantity only to complete the calcining process for larger grains of material. This amount of heat is less than would cause burning of the smaller grains of material. The second calcining zone 21 is approximately twice the length of the first calcining zone 11 to assure that the limestone is subjected to the lower heat transfer for sufficient time to complete the calcining process. It should be apparent that the minor flow of gases through the extended second calcining zone yields a reduction in hydraulic pressure which enables a single fan 24 to move all the gases for recirculation.

It will be appreciated that the only supply of oxygen to the kiln is in the combustion air admitted through the ducts 28 in the material cooling zone. Thus, the adjustment of these ducts 28 control the temperature of the recirculation mixture and burners. Fresh air or combustion gases admitted through these ducts pass upwards through the material cooling zone 27 in counter current to the descending product and accepting heat from the product; thus, becoming preheated. The entire quantity of the combustion gas is drawn into the recirculation collector channel 26 where it is mixed with the aforementioned minor portion of said burnt gases and delivered to the burner 22 for combustion with a fuel. Since the combustion gases which entered through the ducts 28 is relatively cool and since the minor portion of the burnt gases recirculated through the second calcining zone have given up most of their heat to the limestone, it may be seen that the mixture of gases handled by recirculation fan 24 are at a temperature which can be handled by common fans for hot gases.

From the foregoing it may be seen that my invention provides the optimal heat transfer for calcining limestone through the use of a bifurcated calcining zone wherein the major portion of heat transfer occurs through in a first calcining zone in which the limestone and the major portion of the burnt gases flow in counter-current and wherein the minor portion of heat transfer occurs in an extended second calcining zone in which the limestone and minor portion of the burnt gases flow in co-current relationship. As may be seen from the figure, the calcining process occurs in the calcining zones which extends over approximately 65% of the height of the kiln and during a time internal oi about 10 hours; thus providing an extended calcining Process which permits the optimization of the heat transfer.

While I have shown my invention in one form, it will be obvious to those skilled in the art that it is not so limited but is susceptible of various changes and modifications without departing from the spirit thereof.

What I claim is:

1. Apparatus for calcining materials comprising:
   (a) an upstanding hollow shaft kiln, through which the material to be calcined passes downwardly by the force of gravity, defining a plurality of zones including an upper preheating zone, a first calcining zone having a defined length, a second calcining zone having a defined length relative to the length of said first calcining zone with said defined length being approximately twice the length of said first calcining zone, and a material cooling zone;
   (b) air tight charging means at the top of said kiln communicating with supply means for charging said kiln with said material to be calcined;
   (c) means for selectively introducing combustion air into a lower portion of said cooling zone from outside said kiln comprising a plurality of adjustable ducts located at the bottom of said material cooling zone;
   (d) a collector channel adjacent the upper portion of said cooling zone and the lower portion of said second calcining zone;
   (e) a plurality of burners located intermediate said first calcining zone and said second calcining zone in position to inject burnt gases therefrom into said kiln;
   (f) first flow means communicating said collector channel with said burner and including gas conveying means for conveying gases from said collector channel to said burners and creating a negative pressure within said collector channel to convey a minor portion of said burnt gases injected into said kiln downwardly through said second calcining zone in co-current flow with said material to said collector channel for intermingling with said combustion air and recycling to said burners, said minor portion comprising about 20 to 25% of the burnt gases injected to the kiln from said burner; and (g) second flow means communicating with an upper portion of said preheating zone for exhausting burnt gases therefrom and creating a negative pressure within said upper portion of said preheating zone to convey a major portion of said burnt gases injected into said kiln upwardly through said first calcining zone and said preheating zone in counter current flow to said material.

2. A process for calcining materials comprising the steps of:

(a) introducing material to be calcined at the upper end of a hollow shaft kiln through which said material passes downwardly by the force of gravity through a plurality of zones in series including an upper pre-heating zone, a first calcining zone, a second calcining zone having a length approximately twice that of said first calcining zone, and a material cooling zone;

(b) selectively introducing combustion air to said kiln through the lower end of said material cooling zone;

(c) injecting burnt gases resulting from the combustion of a fuel and said combustion air into said kiln intermediate said first calcining zone and said second calcining zone;

(d) subjecting said material to be calcined successively during downward movement thereof through said zones to a counter-current flow of a major portion of said burnt gases in said upper preheating zone and said first calcining zone, a a co-current flow of a minor portion of said burnt gases in said second calcining zone, said minor portion comprising about 20 to 25% of the burnt gases injected into said kiln, and a counter-current flow of said combustion air in said material cooling zone;

(e) withdrawing substantially the entire quantity of combustion air introduced into said material cooling zone and subbstanially the entire quantity of said minor portion of said burnt gases and said combustion air from said kiln shaft intermediate said second calcining zone and said matcrial cooling zone and utilizing the mixture thereof for said combustion of a fuel;

(f) removing said major portion of the burnt gases from said upper part of said kiln; and (g) discharging the calcined product at the lower end of said material cooling zone.

* * * * *